UNITED STATES PATENT OFFICE.

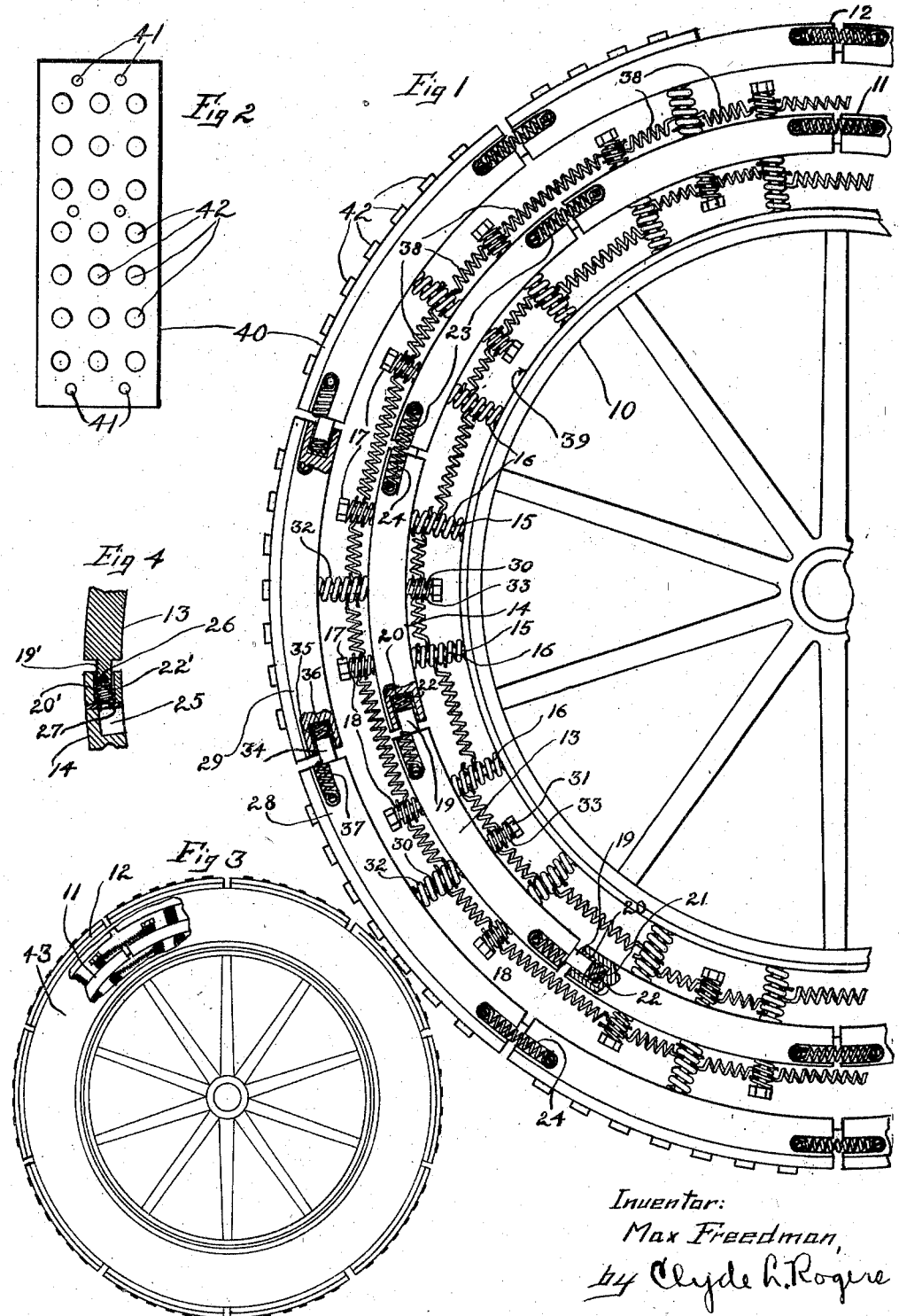

MAX FREEDMAN, OF BROOKLINE, MASSACHUSETTS.

TIRE.

1,307,730.  Specification of Letters Patent.  Patented June 24, 1919.

Application filed October 1, 1915. Serial No. 53,617.

*To all whom it may concern:*

Be it known that I, MAX FREEDMAN, a subject of the Czar of Russia, and resident of Brookline, county of Norfolk, Commonwealth of Massachusetts, have invented an Improvement in Tires, of which the following description, in connection with the accompanying drawings, is a specification, like characters on the drawings representing like parts in each of the several views.

This invention relates to tires for automobiles and other road vehicles. A prime object of the invention is to provide a metallic tire built up of relatively yieldable sections with interposed springs so arranged as to permit free and adequate yielding of the successive tire portions as the wheel revolves. To this end I provide a composite tire structure composed of a plurality of segmental bands yieldingly mounted on the wheel rim and spaced apart therefrom and from each other, the several sections of each band being yieldable with respect to each other as well as with respect to the adjacent segments of the other band. The invention will be better understood from the following detailed description taken in connection with the accompanying drawings and will be thereafter pointed out in the appended claims.

Referring to the drawings:

Figure 1 is a side elevation of a tire constructed in accordance with my invention mounted on a wheel, a portion of one side thereof being broken away;

Fig. 2 is a top plan view of a removable tread plate adapted for use with my improved tire;

Fig. 3 is an elevation on a smaller scale showing a wheel equipped with my improved tire complete; and Fig. 4 is a sectional detail showing one feature of the invention in modified form.

A wheel of an automobile or other vehicle has a rim indicated at 10 adapted to receive my improved tire thereon. My improved tire is composed generally of two sectional ring bands 11, 12, the band 11 being spaced radially from the wheel rim 10 and the band 12 being spaced a similar distance from the band 11. Each of these bands is composed of a series, shown as ten in each case, of segmental sections. The segmental sections of the inner tire band 11 are indicated at 13, 14. These sections are slidably fitted on radial posts 15 which may be bolts radially secured to the rim 10, said posts passing through slots in said sections suitably elongated circumferentially to permit radial movement of the sections. Interposed between the sections 13, 14 and the rim 10 and fitted on the posts 15 are stout coil springs 16 adapted to be compressed as the sections 13, 14 receive the load to impart resiliency thereto as later explained. The posts 15 have their outer ends headed as indicated at 17 and interposed between said heads and the outer sides of the sections 13, 14 are lighter springs 18; the purpose of these springs being to take up any looseness and act on the rebound outward of the sections 13, 14 to retard and ease the same. The sections 13, 14 are interconnected by having a projecting tongue 19 at one end of each thereof fit slidably into a cup 20 formed in the abutting end of the adjacent section, such cups being shown as formed in the sections 14. The cups 20 are preferably and as indicated, fitted with a rubber lining 21 which contributes to noiseless operation and a coil spring 22 is fitted in each of said cups to react against the ends of the tongues 19, these springs of course tending to press the sections 13, 14 apart. For holding the sections 13, 14 slidably interconnected with the tongues 19 yieldingly fitting partly into the cups 20, I provide coil springs 23 having their ends connected to the respective sections 13, 14 adjacent the ends thereof and preferably at both sides, said springs bridging the gap between the sections and being preferably fitted into recesses 24 in the sides of the sections. In Fig. 4 I show a somewhat modified form wherein provision is made for the escape of any dirt or foreign matter that might get into the cups 20. For this purpose a clearance passage and slot 25 is provided opening from the pocket or cup 20′ wherein the spring 22′ is housed so that any dirt getting into the pocket 20′ may readily drop out inward through such slot 25. In this form I also show the spring 22′ connected at its ends to the tongue 19′ by a pin and hook 26 and at its other end to the section 14 at the bottom of the slot 20′ by a cross pin 27, this pin 27 being slotted so as not to interrupt the clearance passage 25. The outer ring band 12 is composed of sections 28, 29 similar to the sections 13, 14, though of course correspondingly larger. These sections 28, 29 have fixed thereto posts 30 projecting radially inward with their inner portions guided through circumferentially elongated passages therefor in the sections 13, 14 and having at their inner ends heads 31. Stout coil springs 32 similar to the springs 16 are mounted on these posts to react between the inner sides of the sections 28, 29 and the outer sides of the sections 13, 14. Thus the load rests on one of the outer sections 28, 29, it being transmitted thereto yieldingly through the springs 32 from the inner sections 13, 14 and to them again yieldingly, through the springs 16 from the rim 10 of the wheel. Lighter coil springs 33 similar to the springs 18, are mounted between the heads 31 and the inner sides of the sections 13, 14 on the posts 30 the purpose of these being to cushion the reaction from the springs 32 and keep the parts tight and reliably connected. The sections 28, 29 are slidably interconnected by tongues 34 fitting into cup sockets 35 with rubber linings similar to the sockets 20 and with like interposed coil springs 36. Also coil springs 37 are provided, connected at their ends to the adjacent ends of the sections 28, 29 to draw them toward each other in like manner as the springs 23, these springs being similarly housed in lateral recesses of the sections. I preferably provide a series of springs 38 connecting adjacent ones of the several springs 18, 32, and also the springs 16, 33 to yieldingly brace and support these several radial springs laterally and to hold the structure properly assembled. A flanged band 39 is preferably fixed to the rim 10, the flanges at each side thereof extending out a little distance radially to guide and hold the connected parts of the tire in place, the inner edges of the sheets 43 hereinafter mentioned being preferably secured to these flanges.

I preferably provide a separate and removable tread in sections, this being shown as a series of metallic plates 40 secured to the several outer sections 28, 29 as by screws 41. Each of these tread plate portions is equipped with a series of calks which may be formed as rubber plugs 42 passed through said plates and projecting outward therefrom, these calks being detachable for renewal as required. Suitable flexible sheets 43 of canvas or the like may be buttoned or otherwise secured to cover the sides of the tire to prevent dirt, stones and other foreign matter from getting into the open spaces between the bands 11, 12 and between the band 11 and the rim. It is of course to be understood that while I show the number of band sections in the bands 11, 12 as ten in each band, this number is merely illustrative and that any desired number of sections may be used in either band. It is also to be understood that the particular type and arrangement of springs shown both as to the radial springs and as to those extending around the wheel, is merely illustrative and that any desired arrangement and type of springs may be employed as found most suitable in each particular case. I therefore desire the present embodiment to be considered in these and other respects as merely illustrative and not restrictive, reference being had to the appended claims rather than to the foregoing description to indicate the scope of the invention.

Having described my invention, what I claim as new and desire to secure by Letters Patent is:

1. A built up tire, comprising a plurality of radially spaced apart segmental metallic ring bands, the inner of said bands being also spaced away from the wheel rim, means for holding said bands resiliently spaced from each other and also resiliently spaced from the wheel rim, and means for holding the segments of each of said bands in yielding slidable relation with one another.

2. A built up tire, comprising a plurality of segmental ring bands yieldingly spaced from each other radially and also spaced from the wheel rim, means for yieldingly connecting adjacent ends of said segments with a slidable interfitting, and means yieldingly resisting the drawing apart of adjacent segments.

3. The combination with a wheel rim having spaced apart radial posts fixed thereto with spiral springs on said posts, of a segmental tire band, the segments thereof being slidably fitted to said posts, and relatively light springs fitted on said posts outside of said segments to react thereagainst, said posts having heads at their outer ends to serve as backings for the last named springs.

4. The combination with a wheel rim having spaced apart radial posts fixed thereto with spiral springs on said posts, of a segmental tire band, the segments thereof being slidably fitted to said posts and yieldingly connected with one another, and relatively light springs fitted on said posts outside of said segments to react thereagainst, said posts having heads at their outer ends to serve as backings for the last named springs.

5. The combination with a wheel rim having spaced apart radial posts projecting therefrom with spiral springs on said posts, of a segmental tire band, the sections thereof being slidably fitted to said posts, certain of the ends of said segments having rubber lined cup sockets with springs fitted therein, and the adjacent ends of abutting segments having tongues slidably fitting said sockets.

6. The combination with a wheel rim having spaced apart radial posts extending therefrom with spiral springs on said posts, and an inner segmental band, the segments thereof being slidably fitted to said posts, of an outer segmental tire band having spaced apart inwardly extending radial posts with springs fitted thereon, said last named posts being fitted to slide through the segments of the first named band, and the last named springs being adapted to react between the segments of the inner and outer bands.

In testimony whereof, I have signed my name to this specification.

MAX FREEDMAN.